United States Patent [19]

Brindle

[11] Patent Number: 5,464,141

[45] Date of Patent: Nov. 7, 1995

[54] ROOFTOP PIPE CONTAINER

[76] Inventor: David R. Brindle, 73 Buttonwoods Ave., Haverhill, Mass. 01830-6453

[21] Appl. No.: 206,348

[22] Filed: Mar. 7, 1994

[51] Int. Cl.[6] .................................................. B60R 9/042
[52] U.S. Cl. ........................ 224/328; 224/310; 224/281; 206/443; 220/8; 220/529
[58] Field of Search ...................... 224/242, 245, 224/309, 310, 328, 281; 206/443; 220/8, 528, 529, 534, 552; 229/125.125

[56] References Cited

U.S. PATENT DOCUMENTS

| | | | |
|---|---|---|---|
| 2,517,186 | 8/1950 | Farrell | 206/46 |
| 3,071,283 | 1/1963 | Shelly | 220/22 |
| 3,406,930 | 10/1968 | Seiler | 244/118 |
| 3,580,439 | 5/1971 | Jewett | 224/42.1 |
| 3,678,611 | 7/1972 | Files | 42/26 |
| 4,303,158 | 12/1981 | Perkins | 206/373 |
| 4,953,773 | 9/1990 | Wirth | 224/328 |

Primary Examiner—Henry J. Recla
Assistant Examiner—Peter S. Hrycko
Attorney, Agent, or Firm—Joseph G. Seeber; David L. Baker; Rhodes & Ascolillo

[57] ABSTRACT

A carrier for carrying elongate materials of varying lengths comprises an outer container, an insert which fits and is slidable within the outer container, and a shelf assembly disposed within the insert for holding the elongate materials. The insert has top access ports (preferably, two) and side access ports for viewing and obtaining access to materials stored within the interior of the insert. The shelf assembly has, preferably, a T-shaped cross-section, and comprises a horizontal member for holding materials stored in an upper portion of the insert, and a vertical member dividing the lower portion of the insert into separate compartments. Further features include a retrieve handle connected to the insert and a pair of brackets for mounting the outer container to the top of a vehicle.

4 Claims, 2 Drawing Sheets

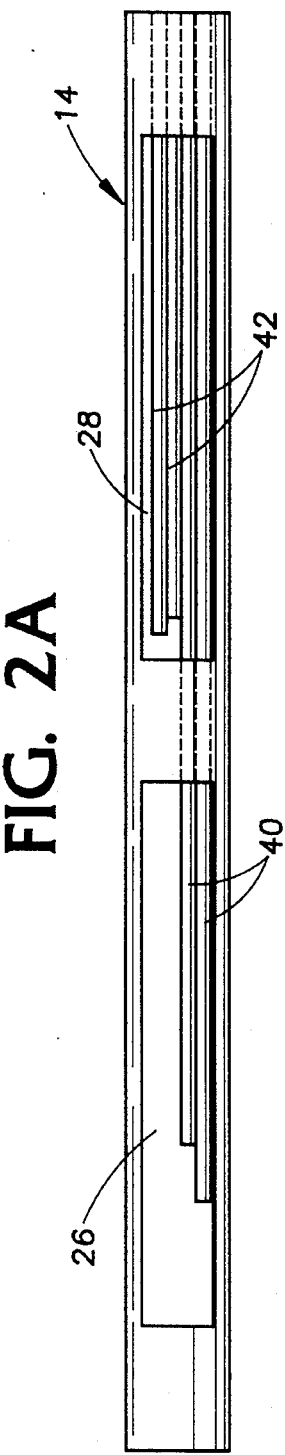
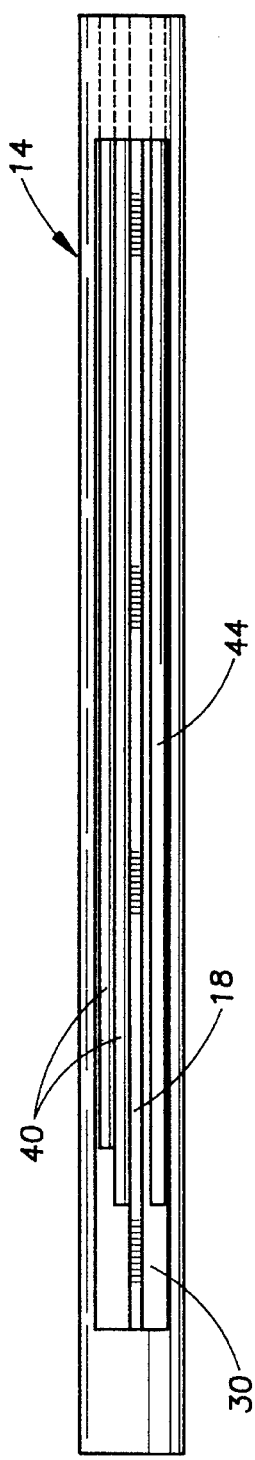
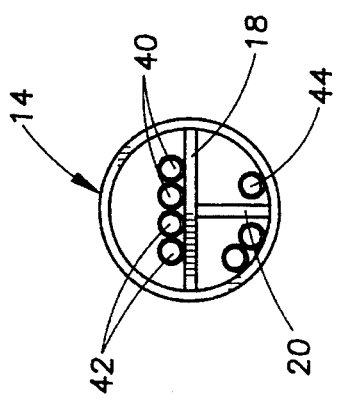

5,464,141

ROOFTOP PIPE CONTAINER

BACKGROUND OF THE INVENTION

1. Field of the Invention

The present invention generally relates to a carrier for carrying elongate materials of varying lengths, and more particularly to a rooftop or roof-mounted container for service vans or other vehicles, the container being designed to carry elongate materials (such as PVC pipe) of varying lengths.

2. Description of the Related Art

Various containers for carrying elongate materials already exist in the art. However, such containers are burdened by several disadvantages. A primary disadvantage of containers of the prior art resides in the fact that such containers do not provide both protection from the elements and theft and easy access to the materials stored in the containers. Moreover, many containers which do provide access to the materials stored in the container do not provide ready access to shorter materials stored in the container.

A further disadvantage of some containers of the prior art relates to the fact that such containers are not able to be mounted on the top of a vehicle, and thus such containers cannot be used by service vans and the like. Furthermore, many containers of the prior art do not provide, within the interior of the container, separate compartments for storage of elongate materials of various lengths or types.

The following patents disclose various containers considered to be representative of the prior art relative to this invention: U.S. Pat. Nos. 2,517,186; 3,071,283; 3,406,930; 3,768,611; and 4,953,773.

SUMMARY OF THE INVENTION

The present invention generally relates to a carrier for carrying elongate materials of varying lengths, and more particularly to a rooftop or roof-mounted container for service vans or other similar vehicles which carry elongate materials (such as PVC pipe).

The carrier of the present invention generally comprises an inner container which fits in and is slidable within the outer container, and a shelf assembly disposed within the insert for holding elongate materials.

Preferably, the insert has a surface which is discontinuous so as to form at least one access port in the surface thereof, thereby providing access to the elongate materials held by the shelf assembly when the insert is slidably withdrawn from its normal resting position within the outer container. In addition, the shelf assembly preferably comprises a horizontal member and a vertical member connected so as to form a T-shaped cross-section, thereby providing separate compartments within the insert for storage of elongate materials of various types and lengths.

Therefore, it is a primary object of the present invention to provide a carrier for carrying elongate materials of varying lengths.

It is an additional object of the present invention to provide a roof-mounted container for service vans or other similar vehicles, the container being designed to carry elongate materials of various lengths or types.

It is an additional object of the present invention to provide a carrier having an insert disposed within an outer container, the insert being provided with at least one access port for easy access to the materials stored within the insert.

It is an additional object of the present invention to provide a carrier having a shelf assembly disposed within the container, the shelf assembly being constructed so as to provide separate compartments within the container for storage of materials of various types or lengths.

The above and other objects of the invention will be further understood by reference to the following detailed description, the associated drawings, and the appended claims.

BRIEF DESCRIPTION OF THE DRAWINGS

FIGS. 2A and 2B are a top view and a side view, respectively, of the insert and its access ports.

FIG. 3 is an end view of the insert and the shelf assembly disposed therein, including various materials stored within the insert.

DESCRIPTION OF THE PREFERRED EMBODIMENT

Figure 1:
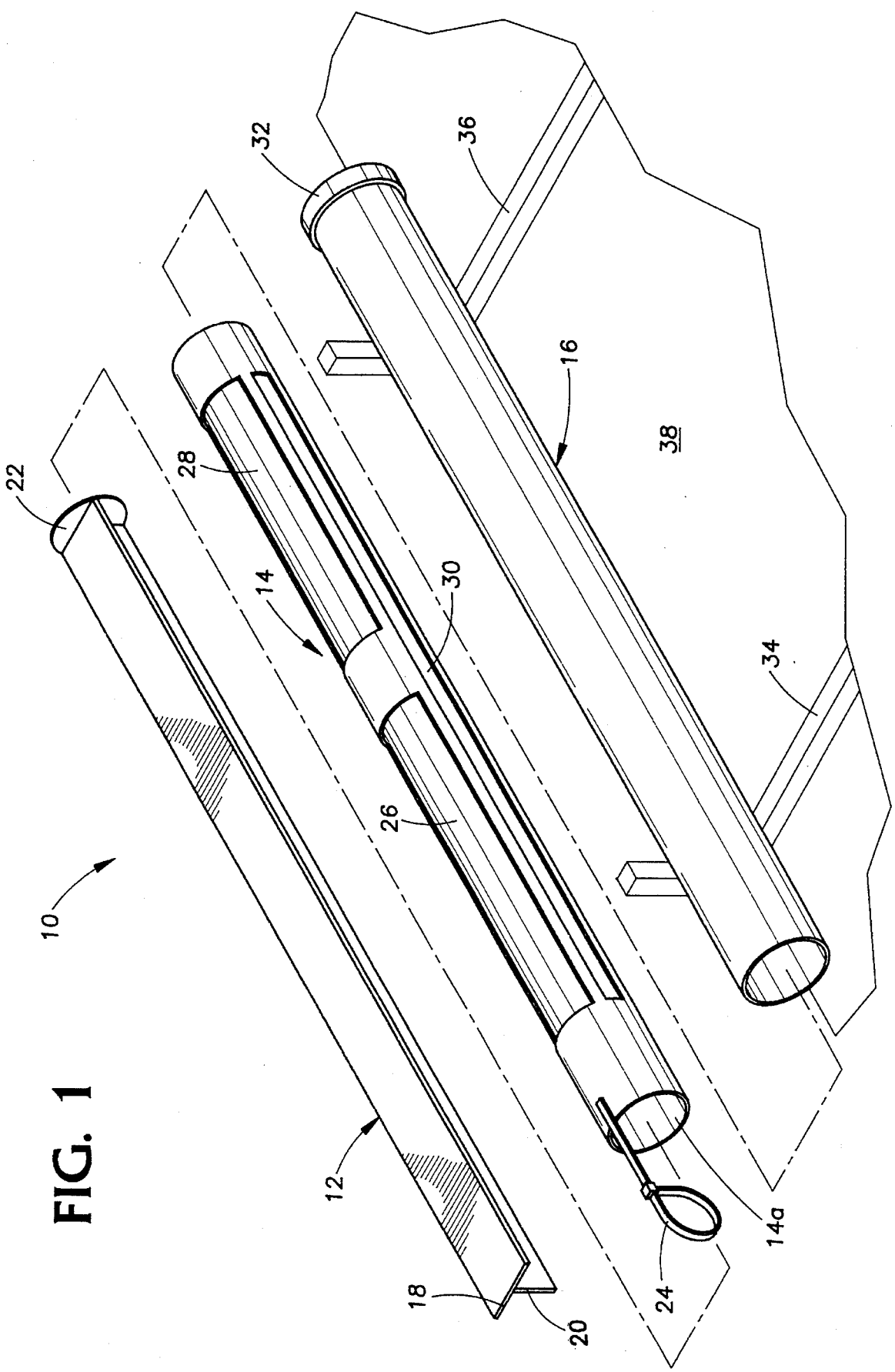
FIG. 1 is a perspective view of the primary elements of the carrier of the present invention.

The invention will now be described in more detail with reference to the various figures of the drawings. As seen in FIG. 1, the carrier 10 generally comprises a shelf assembly 12, a removable insert 14, and an outer container 16. As indicated by the broken line in FIG. 1, in normal usage of the carrier 10, the shelf assembly 12 is slid into and positioned within the insert 14, and the insert 14 with the shelf assembly 12 positioned therein is slid into and positioned within the outer container 16.

The shelf assembly 12 comprises a horizontal member 18 and a vertical member 20 connected thereto so that the members 18 and 20 form a T-shaped cross-section. The vertical member 20 of shelf assembly 12 serves the function of providing support for the horizontal member 18, and this is especially advantageous in situations where heavy materials are stored on horizontal member 18.

The shelf assembly 12 also comprises a shelf end stop 22 which provides structural stability to the interconnected members 18 and 20, and also serves as an abutment limiting the rearward positioning of any materials stored on or in proximity to the shelf assembly 12 within the insert 14.

In a preferred embodiment, the removable insert 14 and outer container 16 are generally cylindrical in shape, and the insert 14 has a hollow interior 14a for receiving the shelf assembly 12. In addition, the cylindrical surface of the insert 14 is discontinuous so as to have cut-out portions forming top access ports 26 and 28 and a longer side access port 30. The top access ports 26 and 28 provide easy access to any materials stored on the horizontal member 18 of shelf assembly 12, while the side access port 30 provides easy access to any materials stored below the horizontal member 18 and on one side of the vertical member 20 of shelf assembly 12. It is to be understood that, in accordance with the invention, an additional side access port (not shown) can be formed on the far side of the insert 14 so as to provide easy access to any materials stored below horizontal member 18 and on the far side of vertical member 20 of shelf assembly 12.

The removable insert 14 is also provided with a retrieve handle 24 so that the user can easily withdraw the removable insert 14 from its normal resting position within the outer container 16. Preferably, the retrieve handle 24 is formed from a 24-inch nylon bundle tie using a pop rivet in the loop to prevent it from closing up when pulled.

Outer container 16 is, preferably, provided with an end plate 32 which closes one end of the container 16, thereby providing an end limit to movement of the removable insert 14 as it is inserted into the outer container 16. Outer container 16 can be constructed from any suitable material, such as a conventional PVC sewer grade pipe.

Since the container of the present invention is uniquely designed for the carrying of elongate materials on top of a service van or other vehicle, mounting brackets 34 and 36 (preferably, L-shaped or U-shaped as shown in FIG. 1) are provided and are mounted on the roof of a vehicle by conventional means, and the outer container 16 is then mounted on brackets 34 and 36, again by any conventional means known to those of skill in the art.

FIGS. 2A and 2B are a top view and a side view, respectively, of the removable insert of the present invention, while FIG. 3 is an end view, looking into the open end (or left end in FIG. 1), of the removable insert of the present invention As previously stated, the removable insert 14 is provided with two access ports 26 and 28. As a result of the provision of the access ports 26 and 28, when the user employs the retrieve handle 24 (FIG. 1) to withdraw the removable insert 14 from the interior of the outer container 16, the user has immediate visual and physical access to the top half of the interior of insert 14, that is, immediate access to that portion of the interior of insert 14 located above the horizontal member 18 of shelf assembly 12 (which is disposed inside insert 14). Furthermore, removable insert 14 is provided with side access port 30 so that, when insert 14 is withdrawn from its normal resting position in outer container 16, the user has immediate access to that portion of the interior of insert 14 located below horizontal member 18 of shelf assembly 12.

Thus, referring to FIGS. 2A, 2B and 3, upon removal of the insert 14 from outer container 16, the user is able to view and have physical access to longer pipes 40 and shorter pipes 42 disposed on the horizontal member 18 of shelf assembly 12 inside insert 14, and to longer pipes 44 disposed below horizontal member of shelf assembly 12. It should be noted that, if access port 28 were not provided, the user might not be able to view and have access to the shorter pipes 42.

Further referring to FIG. 3, as mentioned previously, horizontal member 18 of shelf assembly 12 divides the interior of insert 14 into an upper section and a lower section, so that pipes of different types or lengths can be stored in either the upper section or the lower section, as the user desires. Furthermore, shelf assembly 12 is provided with a vertical member 20 which, as best seen in FIG. 3, provides vertical support to the horizontal member 18 and the pipes 42 located thereon, while at the same dividing the lower half of the interior of insert 14 into a left portion and a right portion. Thus, the user can further divide pipes of different types and lengths for storage in either the lower left portion or lower right portion of the interior of insert 14.

Referring to FIG. 1, it is noted that one embodiment of the invention calls for the shelf assembly 12 to be of approximately the same length as the insert 14 and outer container 16. However, a variation of the invention calls for the shelf assembly 12 to be approximately one-half the length of the insert 14 and outer container 16, so that the horizontal member 18 of shelf assembly 12 is used to store shorter pipes, while the portion of the interior of insert 14 located below horizontal member 18 is used to store longer pipes. In such case, access to the shorter pipes would be via top access port 26, while access to the longer pipes located in the lower half of the interior of insert 14 would be via either top access port 28 or side access port 30.

While preferred forms and arrangements have been shown in illustrating the invention, it is to be understood that various modifications may be made without departing from the spirit and scope of this disclosure. For example, whereas a preferred embodiment of the invention calls for the removable insert 14 and outer container 16 to be generally cylindrical in shape, it should understood that an insert and outer container having a cross-section which is non-circular in shape may just as easily be employed without departing from the scope of this invention.

I claim:

1. A carrier for carrying elongate materials of varying lengths, comprising:

an outer container;

an insert which fits and is slidable within said outer container; and a shelf assembly disposed within said insert for holding said elongate materials;

said shelf assembly has a T-shaped cross-section and comprises a horizontal member and a vertical member connected to said horizontal member;

said horizontal member provides a surface for storage of some of said elongate materials in an upper portion of the interior of said insert, said vertical member dividing a lower portion of said insert into compartments for storage of further said elongate materials;

wherein said insert has a surface which is discontinuous so as to form at least one access port in said surface, thereby providing access to said elongate materials held by said shelf assembly;

said at least one access port comprises a plurality of access ports located on a top and a side, respectively, of said insert;

shorter elongate materials are stored on said horizontal member and longer elongate materials are stored below said horizontal member; and a shelf end stop connected to one end of said shelf assembly.

2. The carrier of claim 1, further comprising bracket means connectable to a top of a vehicle for mounting said outer container to said top of said vehicle.

3. A carrier for carrying elongate materials of varying lengths, comprising:

an outer container;

an insert which fits and is slidable within said outer container; and a shelf assembly disposed within said insert for holding said elongate materials;

said shelf assembly has a T-shaped cross-section and comprises a horizontal member and a vertical member connected to said horizontal member;

said horizontal member provides a surface for storage of some of said elongate materials in an upper portion of the interior of said insert, said vertical member dividing a lower portion of said insert into compartments for storage of further said elongate materials;

wherein said insert has a surface which is discontinuous so as to form at least one access port in said surface, thereby providing access to said elongate materials held by said shelf assembly;

said at least one access port comprises a plurality of access ports located on a top and a side, respectively, of said insert;

shorter elongate materials are stored on said horizontal member and longer elongate materials are stored below said horizontal member;

a shelf end stop connected to one end of said shelf assembly; and said outer container is of generally cylindrical shape, and said insert is of generally cylindrical shape.

4. The carrier of claim 3, further comprising bracket means connectable to a top of a vehicle for mounting said outer container to said top of said vehicle.

* * * * *